May 26, 1931.    C. STEINHILBER    1,806,922
REMOVABLE SAW HANDLE
Filed Dec. 20, 1930
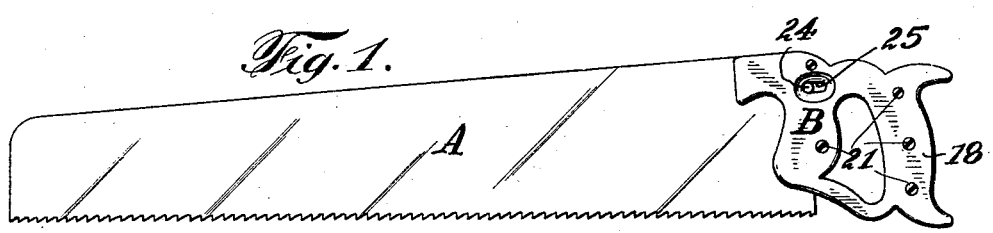
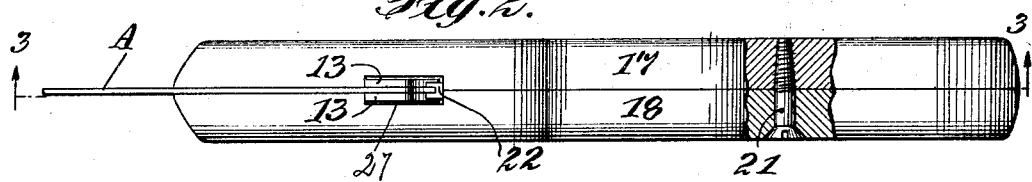
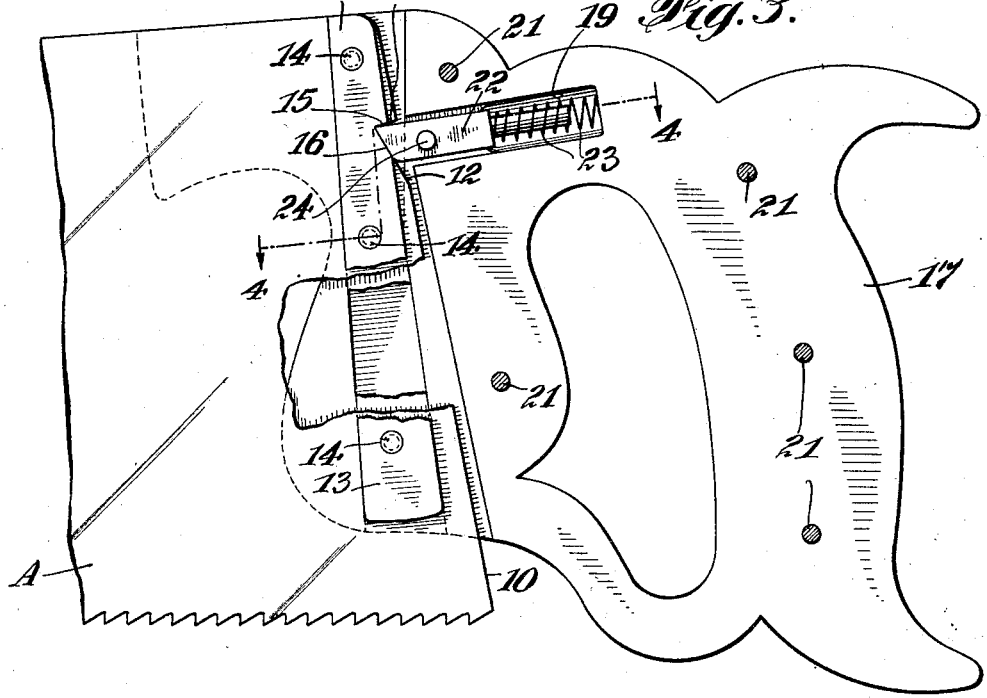
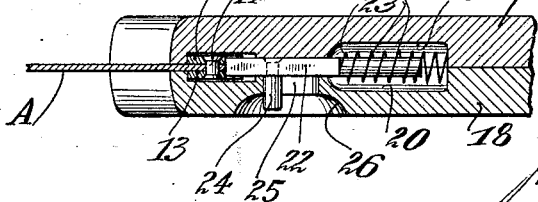
INVENTOR
Ceasar Steinhilber
BY
his ATTORNEY Patented May 26, 1931

1,806,922

UNITED STATES PATENT OFFICE

CEASAR STEINHILBER, OF NORTH BERGEN, NEW JERSEY

REMOVABLE SAW HANDLE

Application filed December 20, 1930. Serial No. 503,717.

The object of my invention is a removable saw handle.

The advantages of removable saw handles are generally recognized among which is the economy of a single handle for a plurality of saw blades and the compactness with which a number of blades with an interchangeable handle can be packed into a tool chest.

Removable saw handles must be strong, easily removed and attached to a plurality of blades and must be capable of a firm and immovable fixation to the blade.

The device of my invention possesses all of the above mentioned, and other desirable attributes, as will be evident upon a consideration of my specification and its accompanying drawings.

In the accompanying drawings illustrating one form of the device of my invention, similar parts are designated by similar numerals.

Figure 1 is a side view of one form of the device of my invention attached to a saw blade.

Figure 2 is a top view of Figure 1, partly broken away for purposes of explanation.

Figure 3 is an enlarged view of my handle and a portion of a saw blade with the front portion of the handle removed for purposes of explanation.

Figure 4 is a section through the line 4—4 of Figure 3.

The particular form of the device of my application illustrated in the drawings comprises a saw blade A and a handle B.

The butt end 10 of the blade A is inclined and has a recess therein having a longitudinal face 11 and an inclined face 12. A metallic clamping plate 13 is attached to each face of the blade A by means of rivets 14, 14, 14, each clamping plate being wider at the bottom than at the top. One edge of each clamping plate 13 has a recess corresponding to the recess in the blade, with the longitudinal face 15 and the inclined face 16.

The handle B consists of two members 17 and 18 of the usual shape and configuration of saw handles. A recess 19 in the member 17 and a recess 20 in the member 18 are in alignment when the two handle members 17 and 18 are attached to each other by means of the screws 21, 21. A latch 22 within the chamber formed by the recesses 19 and 20 is spring pressed outwardly thereof by the spring 23, its outward movement being limited by the stop-pin 24, which extends outwardly through a slot 25 in the handle member 18 into a recess 26 therein.

The saw-ward portions of the handle member 17 and 18 are spaced from each other to allow of the passage of the saw blade therethrough and have also a vertical passageway 27 to allow of the insertion of the clamping members 13, 13.

To affix the handle to the saw-blade, the blade is moved upwardly through the space between the saw-ward portions of the handle, the clamping members 13, 13, thus passing upwardly through the passage-way 27, this movement being continued until the latch 22 is spring pressed into the recesses in the blade and the clamping members as shown particularly in Figure 3.

When the handle and blade are thus positioned, the latch 22 prevents the downward movement of the blade, the fitment of the clamping members in the passage-way 27 prevents its further upward movement and the position of the clamping members and the walls of the spaced portion of the handle abutting upon the blade prevents a longitudinal movement of the handle.

It is thus seen that the handle is firmly fixed to the blade.

To remove the handle, the latch 22 is moved into the handle, thus releasing it from the recesses in the blade and clamping members and the blade moved downwardly with respect to the handle.

It is thus seen that my device consists of a a saw-blade and a removable handle capable of being applied to other saw blades of similar construction.

I do not limit myself to the particular size, shape, number or arrangement of parts as these are given simply as a means for clearly describing my invention.

What I claim is:—

1. In a device of the character described, a saw-blade, having a recess in the butt end portion thereof, a truncated pyramidal clamping member attached to each side of the butt-end portion of said blade and opposite to each other; a recess in the rearward portion of each clamping member; a removable handle having a spaced portion therein through which said blade is slidable and having a passage-way through which said clamping members are slidable; and means capable of insertion within said recesses of said blade and clamping members, preventing the removal of the blade from the handle when said means is thus inserted.

2. In a device of the character described, a saw-blade, having a recess in the butt-end portion thereof, a truncated pyramidal clamping member attached to each side of the butt-end portion of said blade and opposite to each other; a recess in the rearward portion of each clamping member; a removable handle having a spaced portion therein through which said blade is slidable and having a passage-way through which said clamping members are slidable; and a latch capable of insertion within said recesses of said blade and clamping members, preventing the removal of the blade from the handle when said latch is thus inserted.

3. In a device of the character described, a saw-blade, having a recess in the butt-end portion thereof, a truncated pyramidal clamping member attached to each side of the butt-end portion of said blade and opposite to each other; a recess in the rearward portion of each clamping member; a removable handle having a spaced portion therein through which said blade is slidable and having a passageway through which said clamping members are slidable; and a spring controlled latch capable of insertion within said recesses of said blade and clamping members, preventing the removal of the blade from the handle when said spring controlled latch is thus inserted.

Signed at New York city in the county of New York and State of New York this 16th day of December, 1930.

CEASAR STEINHILBER.